(12) United States Patent
Carberry et al.

(10) Patent No.: US 10,270,094 B2
(45) Date of Patent: Apr. 23, 2019

(54) POROUS SINTERED SUPERSTRUCTURE WITH INTERSTITIAL SILICON FOR USE IN ANODES FOR LITHIUM BATTERIES

(71) Applicant: Mossey Creek Technologies Inc., Jefferson City, TN (US)

(72) Inventors: John Carberry, Talbott, TN (US); Tim Wilson, Lafayette, CA (US)

(73) Assignee: Mossey Creek Technologies, Inc., Jefferson City, TN (US)

( * ) Notice: Subject to any disclaimer, the term of this patent is extended or adjusted under 35 U.S.C. 154(b) by 233 days.

(21) Appl. No.: 14/932,408

(22) Filed: Nov. 4, 2015

(65) Prior Publication Data

US 2017/0125805 A1    May 4, 2017
US 2017/0317347 A9    Nov. 2, 2017

Related U.S. Application Data

(60) Provisional application No. 62/188,963, filed on Jul. 6, 2015.

(51) Int. Cl.

| | |
|---|---|
| *H01M 4/38* | (2006.01) |
| *H01M 4/587* | (2010.01) |
| *H01M 10/0525* | (2010.01) |
| *H01M 4/04* | (2006.01) |
| *H01M 4/80* | (2006.01) |
| *H01M 4/13* | (2010.01) |

(Continued)

(52) U.S. Cl.
CPC ......... *H01M 4/386* (2013.01); *H01M 4/0416* (2013.01); *H01M 4/0471* (2013.01); *H01M 4/13* (2013.01); *H01M 4/362* (2013.01); *H01M 4/587* (2013.01); *H01M 4/80* (2013.01); *H01M 10/0525* (2013.01); *H01M 2004/021* (2013.01)

(58) Field of Classification Search
CPC .. H01M 4/386; H01M 4/0416; H01M 4/0471; H01M 4/13; H01M 4/587; H01M 4/80; H01M 10/0525
See application file for complete search history.

(56) References Cited

U.S. PATENT DOCUMENTS

| | | |
|---|---|---|
| 6,605,390 B1 | 8/2003 | Moore et al. |
| 8,785,089 B2 | 7/2014 | Gross et al. |
| 2004/0170895 A1 | 9/2004 | Takeuchi et al. |

(Continued)

OTHER PUBLICATIONS

Xin Zhao, Composites of Graphene and Encapsulated Silicon for Practically Viable High-Performance Lithium-Ion Batteries, Nano Research ISSN 1998-0124.

(Continued)

*Primary Examiner* — Stewart A Fraser
*Assistant Examiner* — Rachel L Zhang
(74) *Attorney, Agent, or Firm* — Pitts & Lake, P.C.

(57) ABSTRACT

Anodes for the lithium secondary batteries include a strong, electrically conductive, porous superstructure filled with a milled or melted interstitial material, such as nano-scaled silicon; the milled or melted interstitial material provides high lithiation capacity, and the superstructure provides durability and controls the anode's electromechanical expansion and contraction during the lithiation and de-lithiation cycle. Embodiments include porous superstructures comprised of silicon carbide, tungsten, and other materials, many of which offer capability of lithiating.

19 Claims, 2 Drawing Sheets

(51) Int. Cl.
*H01M 4/36* (2006.01)
*H01M 4/02* (2006.01)

(56) References Cited

U.S. PATENT DOCUMENTS

| | | | |
|---|---|---|---|
| 2009/0305131 A1 | 12/2009 | Kumar et al. | |
| 2010/0221633 A1* | 9/2010 | Fujita | H01M 8/241 429/452 |
| 2011/0311873 A1* | 12/2011 | Schulz | C01B 31/00 429/231.8 |
| 2012/0009729 A1* | 1/2012 | Carberry | B29C 35/0805 438/97 |
| 2013/0045423 A1 | 2/2013 | Lim et al. | |
| 2013/0252101 A1 | 9/2013 | Zhou et al. | |
| 2014/0093782 A1* | 4/2014 | Gardner | C25F 3/12 429/246 |

OTHER PUBLICATIONS

Qianfan Zhang, First-principles Approaches to Simulate Lithiation in Silicon Electrodes, School of Material Science and Engineering, Beihang University, Beijing 100191, China.

Julius M. Schoop, Engineered Surface Properties of Porous Tungsten from Cryogenic Machining, University of Kentucky UKnowledge 2015.

Matthew T. McDowell, 25th Anniversary Article: Understanding the Lithiation of Silicon and Other Alloying Anodes for Lithium-Ion Batteries, www.advmat.de.

Jung-Hye Eom, Processing and properties of macroporous silicon carbide ceramics: A review, www.elsevier.com/locate/jascer.

Young-Wook Kim, Processing & Mechanical Properties of Porous Silica Bonded Silicon Carbide Ceramics, http://www.researchgate. net/publication/225712032_Processing_and_Mechanica.

Xiuwen Wu, Thermal Conductivity and Microstructure Properties of Porous SiC Ceramic Derived from Silicon Carbide Powder, Jan. 2013 (http://www.scirp.org/journal/njgc).

Zhao Hongsheng, Preparation and properties of porous silicon carbide ceramics through coatmix and composite additives process, www.sciencedirect.com Nov. 2010.

A. H. Rashed, Properties and Characteristics of Silicon Carbide, 2002 Poco Graphite, Inc. www.poco.com.

Patent Cooperation Treaty, Int'l Search Report & Written Opinion, Form PCT/ISA/220 (dated Jul. 2014).

* cited by examiner

POROUS SINTERED SUPERSTRUCTURE WITH INTERSTITIAL SILICON FOR USE IN ANODES FOR LITHIUM BATTERIES

CROSS-REFERENCE TO RELATED APPLICATIONS

This application claims the benefits of U.S. Provisional Application No. 62/188,963, filed on Jul. 6, 2015, which is incorporated by reference in its entirety.

STATEMENT REGARDING FEDERALLY SPONSORED RESEARCH OR DEVELOPMENT

Not Applicable

BACKGROUND OF THE INVENTION

1. Field of Invention

The present general inventive concept relates to components for batteries and more particularly to sintered anodes for lithium batteries and to methods and processes to fabricate such anodes.

2. Description of the Related Art

A secondary battery differs from a primary battery in that unlike a primary battery which is a single use non-rechargeable device, a secondary battery can be recharged many times. It value is established by a number of factors, for instance its power factors and cost, and of course its ability to be recycled quickly and reliably with steady power is a main factor in its value.

Lithium ion secondary batteries are today limited by the low function of current electrodes, particularly the anode. Lithium can function at levels as high as 3840 mAh/g, so the output of a secondary lithium ion battery is limited to less than this level by the level of the electrode materials, particularly the negative electrode. To date, graphite has been the material of choice since it can be structured for long life with many cycles of charge and discharge. This is currently more highly valued than level of power. So the capacity and number of cycles without unacceptable degradation of the lithium ion secondary battery mainly depends on an active material of an electrode, being the anode. The theoretical capacity of graphite is 372 mAh/g. It is engineered today with a capacity of as high as 350 mAh/g, with thousands of charge/discharge cycles.

In order to realize higher capacity secondary lithium ion batteries, it is necessary to supply a negative electrode material having a theoretical capacity closer to that of lithium. When the secondary lithium ion battery charges, lithium ions migrate from the cathode to the anode. This causes the anode to swell in acquiring this charge through the lithium ions. When the secondary lithium ion battery discharges lithium ions migrate from the anode to the cathode and this causes the anode to shrink. In the case of silicon, which provides a theoretical 4200 mAh/gram, this swelling and shrinking can be as much as 400%. Supplying a negative electrode, the anode, that can provide a capacity closer to lithium must be accompanied by an ability to provide service through many thousands of cycles with minimal degradation meaning this shrinking and swelling does not cause material damage that reduces or eliminates electrical conductivity in the structure.

U.S. Pat. No. 9,054,373, issued Jun. 9, 2015 to Abouimrane et al., teaches the fabrication of composite materials of a metal oxide and a metal carbon alloy to buffer the volume expansion associated with lithium alloying of metal oxides. In particular, Abouimrane et al. teach the mixing of tin cobalt carbon alloys with a metal oxide material. Ali Abouimrane and Khalil Amine disclose that "a small amount of silicon" can increase the capacity of an anode, but they teach that the amount of silicon that may be added is limited due to what they see as "large volume expansion and poor cycleability" associated with silicon. They teach that silicon oxides "can crack easily due to volume changes during charging and discharging cycles."

Julius M. Schoop, in his doctoral dissertation, discusses the surface properties of porous tungsten, particularly in its use in dispenser cathodes. Schoop, Julius M., "Engineered Surface Properties of Porous Tungsten from Cryogenic Machining" (2015), *Theses and Dissertations—Chemical and Materials Engineering*, Paper 49 (Univ. of Kentucky). Schoop discloses porous tungsten that "operates much like a sponge that both holds and releases a secondary medium as needed." Schoop in particular teaches porous tungsten backfilled with barium-based compounds.

Cronin, in his discussion of dispenser cathodes, discusses the possibility of dispenser cathodes "of the mixed-metal matrix type," and in particular cathodes that combine either tungsten or molybdenum with one of the platinum family of metals. These cathodes are fabricated with "a controlled porosity matrix configuration impregnated with a barium calcium aluminate type mix." Cronin, J. L., "Modern Dispenser Cathodes," *IEE Proc.* 128(1) (February 1981).

Neither Schoop nor Cronin discuss porous tungsten in connection with anodes.

Kuzubov et al. discuss the lithiation of "graphitelike" [sic] boron carbide. Kuzubov, A. A., Fedorov, A. S., Eliseeva, N. S., Tomilin, F. N., Avramov, P. V., Fedorov, D. G., "High Capacity Electrode Material $BC_3$ for Lithium Batteries Proposed by ab Initio Simulations," *Physical Review B* 85 (2012), 195415.

Zhao et al. discuss composite anodes of graphene and silicon; in particular, they look at anodes developed by encapsulating silicon particles "via in-situ polymerization and carbonization of phloroglucinol-formaldehyde gel, followed by incorporation of graphene nanoplatelets." Zhao, X., Li, M., Chang, K.-H., Lin, Y.-M., "Composites of Graphene and Encapsulated Silicon for Practically Viable High-Performance Lithium-Ion Batteries."

Yi Cui and colleagues discuss alloying anodes "such as silicon" for high energy density lithium-ion batteries. Because these alloying anodes "usually exhibit a short cycle life due to the extreme volumetric and structural changes that occur during lithium insertion/extraction," Cui et al. look at silicon nanostructures "that can accommodate the lithiation-induced strain." McDowell, M. T., Lee, S. W., Nix, W. D., Cui, Y., "25th Anniversary Article: Understanding the Lithiation of Silicon and Other Alloying Anodes for Lithium-Ion Batteries," *Advanced Materials* (2013) (Review Article), DOI: 10.1002/adma.201301795.

BRIEF SUMMARY OF THE INVENTION

Disclosed herein are anodes for the lithium secondary battery which include a porous superstructure filled with a milled interstitial material, such as nano-scaled silicon; the milled interstitial material provides high lithiation capacity, and if the silicon is small enough the lithiation will not cause mechanical failure in the silicon. Alternatively one can fill the porosity of the superstructure post superstructure fabrication though melting of silicon in contact with the superstructure and "wicking" the silicon into the superstructure through the capillary forces. The superstructure provides durability and can control the anode's electromechanical expansion and contraction during the lithiation and de-lithiation cycle. Embodiments include porous superstructures comprised of silicon carbide, tungsten, and other materials. The alternatives of filling the porosity with the nano milled silicon or wicking the silicon in post superstructure through melting and using capillary forces to "wick" the silicon to fill the superstructure is determined by the processing temperature and atmosphere used for the fabrication of the superstructure. Silicon melts at about 1414 centigrade.

One object of the present general inventive concept is to provide electrodes for a lithium secondary battery for an automobile or similar vehicle, where those electrodes enable that lithium secondary battery to be charged quickly; to be light weight; to allow the vehicle to travel on the order of 300 miles on one charge; to be charged very quickly—close to the time required to fill a gas tank and use the rest room on the highway—and to be reusable/rechargeable over a long use life of 10,000 cycles or more. To that end, present general inventive concept, in some of its many embodiments, includes electrodes for the lithium secondary battery that feature a porous superstructure filled with an interstitial material, generally milled silicon; the milled silicon provides high lithiation capacity, and the superstructure provides durability and decreases the electrode's electromechanical expansion and contraction during the lithiation and de-lithiation cycle. Thus, such electrodes sacrifice some capacity (compared to pure silicon) for the sake of durability and long usable life, while still achieving appreciably higher capacities than graphite anodes and other anodes known in the art. However, it should be noted that a superstructure can be selected that also lithiates. For instance, silicon carbide, properly constructed, can lithiate at 700 mAh/gram or higher, thus creating a composite anode where the proportional contributions of the materials provide a much higher total capacity.

In some embodiments of the present general inventive concept, an anode for a lithium ion secondary battery encompasses a porous superstructure and an interstitial material including silicon derived from milled silicon particulates, said silicon particulates being milled in an attrition mill so that said silicon particulates have a median particle diameter of less than 1,000 nanometers and are substantially equiaxed or silicon filled by melting and capillary forces.

In some embodiments, said interstitial material including silicon derived from milled or melted silicon particulates includes a dopant.

In some embodiments, said dopant includes boron, phosphorous, arsenic or other typical semiconductor dopants.

In some embodiments, said anode further includes graphite for the purpose of coating the silicon and superstructure material with graphite or graphene.

In some embodiments, the silicon particulates have a median particle diameter of between 50 nanometers and 800 nanometers.

In some embodiments, the silicon particulates have a median particle diameter of approximately 140 nanometers.

In some embodiments, said porous superstructure includes silicon carbide.

In some embodiments, said anode is fabricated by sintering the silicon carbide with the interstitial material including silicon derived from milled silicon particulates. Very fine graphite can be co-milled in ethanol with the silicon carbide and silicon and form a nano size carbon coating on the silicon carbide and silicon which when sintered in a $10^{-5}$ or $10^{-6}$ torr vacuum at 1,400 centigrade will form a graphene coating on the silicon and silicon carbide, said coating not be converted to silicon carbide. This coating precludes oxidation on the surface of the particle, increases electrical conductivity of the surface of the particle, enhances the Schottky effect and increases both the rate and total amount of lithiation.

In some embodiments, said porous superstructure includes tungsten. Said tungsten is normally pressed binder free and sintered in a vacuum or hydrogen at 1600 centigrade, said porosity being defined by the starting tungsten particle sizes pressed and sintered. Such a porous tungsten body will have very high electrical conductivity while offering high strength, in the range of 400 GPa elastic modulus and 200 MPa tensile strength.

In some embodiments of the present general inventive concept, a process for creating a silicon-based electrode for a lithium ion secondary battery includes milling silicon in an attrition mill, thereby producing milled silicon particulates that have a median particle diameter of less than 600 nanometers and are substantially equiaxed; either milling the silicon with silicon carbide, or milling the silicon carbide separately and then mixing, pressing the milled silicon/silicon carbide particulates into a pre-form; and sintering the milled silicon particulates in the pre-form silicon particulates with silicon carbide to produce a sintered product, whereby the sintered product includes a silicon carbide continuous phase and an interstitial milled silicon particulate continuous phase. The silicon carbide will also offer high electrical conductivity, lithiate and offer strength of about 600 GPa elastic modulus and 200 MPa tensile strength.

In some embodiments, a dopant is added to the silicon in the attrition mill.

In some embodiments, said dopant includes boron, phosphorous, arsenic or other single or compound common semiconductor dopants.

In some embodiments, said electrode further comprises graphite which added to the mill in a very fine form, less than a micron, and co milled with the silicon and or silicon carbide and milled to nano size and then left by the evacuated ethanol or other solvent on the surface and when sintered at 1,400 centigrade in a $10^{-5}$ or $10^{-6}$ torr vacuum converts to a graphene coating and not converting to silicon carbide.

In some embodiments, the silicon particulates have a median particle diameter of between 50 nanometers and 800 nanometers.

In some embodiments, the silicon particulates have a median particle diameter of approximately 140 nanometers.

In some embodiments of the present general inventive concept, an anode for a lithium-ion secondary battery includes a porous superstructure, said porous superstructure including an electrically conductive material, said porous superstructure having a porous matrix; and an interstitial material including silicon, said interstitial material being positioned within the porous matrix.

In some embodiments, said porous superstructure includes silicon.

In some embodiments, said interstitial material including silicon further includes graphene.

In some embodiments, said porous superstructure includes silicon carbide.

In some embodiments, said interstitial material including silicon further includes graphene.

In some embodiments, said interstitial material includes milled silicon particulates having a median diameter of less than one micron, said milled silicon particulates being sintered with said silicon carbide.

In some embodiments, said milled silicon particulates have a median diameter of approximately 140 nanometers.

In some embodiments, said porous superstructure includes tungsten.

In some embodiments, said interstitial material is introduced to said porous matrix during fabrication by melting silicon in contact with the tungsten so that capillary forces introduce silicon into said porous matrix.

In some embodiments, said interstitial material including silicon further includes graphene.

In some embodiments, interstitial material including silicon further includes a dopant selected from the group consisting of boron, phosphorus, arsenic, antimony, bismuth, gallium, indium, thallium, and germanium.

In some embodiments of the present general inventive concept, an anode for a lithium-ion secondary battery includes an electrically conductive superstructure including a porous matrix; and an interstitial material including silicon, said interstitial material being positioned within the porous matrix of the electrically conductive superstructure, said interstitial material including graphene.

In some embodiments, said electrically conductive superstructure including a porous matrix includes a material selected from the group consisting of silicon, silicon carbide, tungsten, and molybdenum.

In some embodiments, said electrically conductive superstructure includes silicon or silicon carbide and said interstitial material includes milled silicon particulates having a median diameter of less than one micron.

In some embodiments, said electrically conductive superstructure includes silicon carbide, gallium nitride, gallium arsenic, or other compound semiconductors, or combinations of the above.

In some embodiments, said electrically conductive superstructure includes tungsten or molybdenum and said interstitial material is introduced to said porous matrix during fabrication by melting silicon in contact with the electrically conductive superstructure so that capillary forces introduce silicon into said porous matrix.

In some embodiments, the interstitial material including silicon further includes a dopant selected to affect the electromechanical properties of the interstitial material.

In some embodiments, said dopant is selected from the group consisting of boron, phosphorus, arsenic, antimony, bismuth, gallium, indium, thallium, and germanium.

In some embodiments of the present general inventive concept, a process for fabricating an anode for a lithium-ion secondary battery encompasses providing a superstructure material with a porous matrix; and infiltrating the porous matrix with an interstitial material including silicon.

In some embodiments, said superstructure material with a porous matrix includes silicon or silicon carbide and infiltrating the porous matrix with an interstitial material including silicon involves milling silicon in an attrition mill, thereby producing milled silicon particulates that have a median particle diameter of less than one micron and are substantially equiaxed; pressing the milled silicon particulates into a pre-form with said superstructure material; and sintering said milled silicon particulates and said superstructure material at a temperature less than 1,400 degrees Celsius.

In some embodiments, the step of milling silicon in an attrition mill further includes mixing graphite with silicon in the attrition mill and milling silicon with graphite to form silicon particulates that include a coating of graphene.

In some embodiments, milled silicon particulates have a median particle diameter of less than 200 nanometers.

In some embodiments, milled silicon particulates have a median particle diameter of approximately 140 nanometers.

In some embodiments, said superstructure material with a porous matrix includes tungsten or molybdenum and infiltrating the porous matrix with an interstitial material including silicon involves melting silicon in contact with the porous matrix so that the capillary forces wick silicon into the porous matrix of the superstructure material.

BRIEF DESCRIPTION OF THE SEVERAL VIEWS OF THE DRAWINGS

The above-mentioned features and other aspects of the invention will become more clearly understood from the following detailed description of the invention read together with the drawings in which.

DETAILED DESCRIPTION OF THE INVENTION

Figure 1:
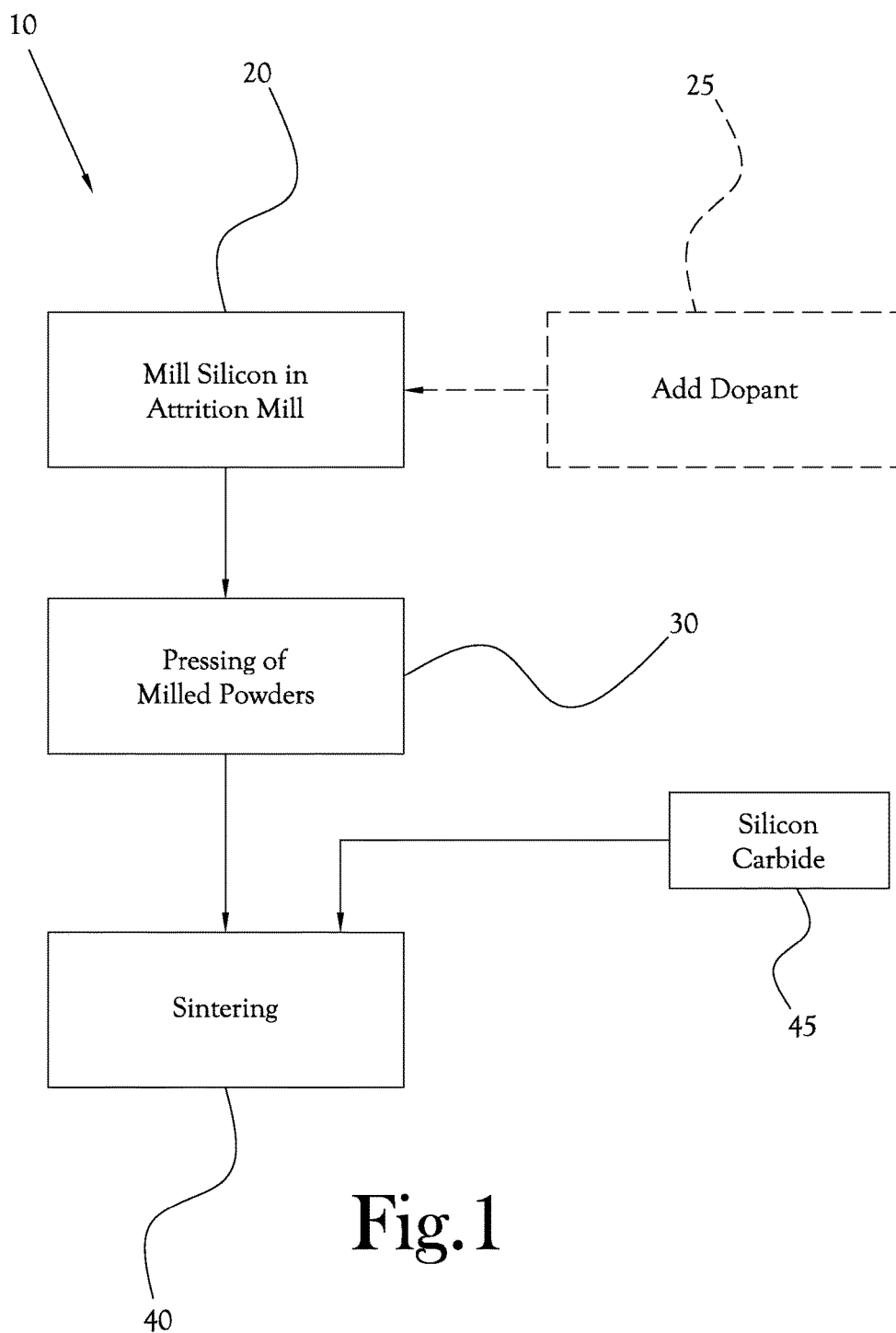
FIG. 1 is a flow diagram of an example embodiment of a method for fabricating a silicon-based porous superstructure filled with milled interstitial silicon.

Disclosed herein are methods and processes to fabricate high capacity, durable electrodes, and particularly anodes, for lithium secondary batteries.

Also disclosed herein are methods and processes that encompass the use a high-purity, porous silicon sintered into a structure that will achieve a very high capacity.

Lithium secondary batteries have particular application in the field of battery-powered and/or hybrid vehicles. The challenge in this context is to provide a lithium secondary battery for an automobile or similar vehicle, where that lithium secondary battery will charge quickly; be light weight; allow a vehicle to travel on the order of 300 miles on one charge; and be reusable (i.e. rechargeable) over a long life—generally 10,000 cycles or more.

At the present time, lithium ion secondary batteries are limited by the low function/low capacity of current electrodes. Using silicon can increase electrode output by an order of magnitude, but to be competitive, electrodes using silicon must be reasonably priced and must have effective working lives comparable to other electrodes currently in use.

Lithium provides 3840 mAh/g, whereas the graphite anodes typically used today with lithium ion batteries only have a capacity of around 350 mAh/g (with a theoretical upper limit of 372 mAh/g). The low capacity of graphite anodes and similar anodes available on the market at this time limits the charging ability of lithium ion secondary batteries, making them slow to recharge—a definite disadvantage for a vehicle power source.

Silicon can provide the best at 4200 mAh/g capacity—more than enough to allow fast charging and discharge of electricity from a lithium ion secondary battery. However, silicon, by itself, is brittle: the fact that silicon expands and contracts 400% through lithiation and de-lithiation has made it unusable to date, since this violent electromechanical expansion and contraction causes mechanical failure, leading to a very short effective life for the anode (i.e. nowhere near the targeted 10,000 charge/discharge cycles).

The present general inventive concept, in some of its many embodiments, encompass silicon-based anodes that combine silicon with other materials to minimize the effects of pure silicon's electromechanical expansion and contraction during the lithiation and de-lithiation cycle. These anodes sacrifice some capacity (compared to pure silicon) for the sake of durability and long usable life; still, these anodes according to the present general inventive concept achieve appreciably and significantly higher capacities than graphite anodes and other anodes known in the art.

In some embodiments of the present general inventive concept, an anode for the lithium secondary battery includes a porous superstructure filled with milled silicon; the milled silicon provides high lithiation capacity, and the superstructure provides durability and controls the anode's electromechanical expansion and contraction during the lithiation and de-lithiation cycle. In some embodiments, the superstructure also contributes to the performance of the anode by lithiating. For instance, silicon carbide coated with graphene is a very strong performer. Silicon coated with graphene performs better as well. A silicon carbide superstructure filled with nano or melted silicon, coated with graphene, performs to the sum of the composite's elements' contributions by their volume, silicon at 4200 mAh/g and silicon carbide at 700 mAh/g.

Generally, the anode superstructure is an order of magnitude stronger and is electrically conductive. In some embodiments, but not all, the anode superstructure lithiates.

In some embodiments, the porous superstructure is silicon-based. Various embodiments include porous superstructures fabricated from silicon carbide. In some embodiments, the porous superstructure includes a small amount of graphite. For instance, silicon particles milled to 140 nanometers and coated with graphene and sintered into a porous structure can be expected to perform at the highest level and experienced much reduced degradation over many cycles.

Generally, the filler material or interstitial material (hereinafter generally "interstitial material") is substantially pure milled silicon or doped milled silicon. In some embodiments, the filler silicon is doped with boron, phosphorous, arsenic or other common single or compound semiconductor dopants. In some embodiments the silicon is "wicked" into superstructures fabricated earlier, filling the porous superstructure through capillary action.

In some embodiments, the porous superstructure is tungsten-based. In these embodiments, the interstitial material is generally silicon or doped silicon melted into the porous tungsten.

In order to realize higher capacity secondary lithium ion batteries one must supply a negative electrode material having a theoretical capacity closer to that of lithium. Silicon is an optimal candidate, but for the fact that when silicon is charged up to the maximum capacity, the volume expands up to 400%. When the secondary lithium ion battery charges, lithium ions migrate from the cathode to the anode. This causes the anode to swell in acquiring this charge through the lithium ions. When the secondary lithium ion battery discharges lithium ions migrate from the anode to the cathode and this causes the anode to shrink. In the case of silicon, which provides a theoretical 4200 mAh/gram, this swelling and shrinking can be as much as 400%. Supplying a negative electrode, the anode, that can provide a capacity closer to lithium must be accompanied by an ability to provide service through many thousands of cycles with minimal degradation meaning this shrinking and swelling does not cause material damage that reduces or eliminates electrical conductivity in the structure. This expansion tends to be isomeric, if there is enough electrical conductivity, which silicon easily provides if it is appropriately doped, causing mechanical stress leading to fatigue and failure. If space is not provided for this expansion the mechanical stress of this expansion across larger structures will cause failure and limit the number of charging cycles.

The volume ratio of silicon to porosity spaces available in these structures allows the particles and the nano structure to accommodate the mechanical stresses incumbent in the physical stresses associated with 400% expansion. An average particle size of the silicon particles in the 3DNP structure between about 30 and 1000 nm will provide function for a strong mechanical equilibrium through the insertion/extraction expansion contraction of each cycle. One should also be mindful that a silicon particle of less than 200 nanometers is unlikely to suffer any mechanical failure from the shrink swell lithiation cycle. But it will need to be able to conduct electricity. Given that the $1/20^{th}$ contact area for a 200 nanometer angular particle is about 10 nanometers, this is above the quantum size effect for transversing the electron physically. This quantum size effect at 5-8 nanometers is also the size identified in contact resistance where, below this size, Ohms law is no longer obeyed. So with control of the average particle size of the silicon particles in the 3DNP structure an article is manufactured to this tolerance, and the advantages of silicon including high mAh/g and long life with many cycles can be realized with low cost.

Smaller silicon particles of course suffer stresses farther below the limits of the modulus as a function of their size, so smaller size is preferable for enduring many cycles without mechanical failure. In many embodiments, it is a feature that very small particles are bonded together below the melting point of silicon and that the smaller particles will impart a smaller stress on those bonded joints. Bonding with graphene will increase strength and electrical conductivity and advance the Schottky effect.

In the case of the present general inventive concept, the fact of an ability to create a large economical throughput of nano-sized, slightly angular silicon also provides the ability to make desired large shapes in porous silicon—in contrast to the prior art, which lacks the ability to make large economical strong form factors.

One positive source of silicon for this application is a very pure silicon manufactured from the "Siemens" process, often called polysilicon. Typical purity post processing is typically nine nines purity measuring 30 metals. In this case, metallurgical silicon is processed into a chemical precursor so that it can be purified by distillation before deposition into an ingot or boulle through CVD. This material can be "doped" with elements, for instance from column III of the periodic chart, for example boron, or column V, for example phosphorous and arsenic are common. In this way electrical conductivity and other semiconductor behaviors can be tailored.

The challenge, and heretofore unrealized technology, is how to convert this solid bulk material into a porous structure that will lend itself to large porous bulk structures with ideal properties such as purity and electrical conductivity.

In various embodiments of the present general inventive concept, the crushed product from the Siemens process is milled in a high energy attrition mill with small ceramic media under ethanol. This milling approach has the benefit other approaches cannot offer in its ability to economically create a nano sized powder with narrow particle size distribution.

A normal ball mill is limited in that the energy is defined by the dropping of the media. The larger the media, the larger the energy but the wider the distribution with smaller particle size, often limited to a D50 of about 4 microns. If one uses smaller media, the distribution can be narrowed, but the D50 will be much larger.

In accordance with the present general inventive concept, it is possible to impart very high energy with small media by increasing the revolutions per minute of the rotating paddles in the attrition mill. It is therefore possible to have very high energy with small media, a result not achievable with a conventional mill or jet mill, where the energy is diminished by the diminishing mass of the particles. In attrition milling according to the present general inventive concept, it is also possible to control the ratio of powder, liquid or not, viscosity of liquid, and media. U.S. Pat. No. 6,638,491 to Carberry teaches a safe and economical method for nano-sizing silicon safely and economically.

As the attrition mill diminishes the powder's size the grains become more and more equiaxed but remain angular, and remain essentially in the same state of purity as when introduced to the mill. As one achieves for example a D50 in the range of 400 nanometers, virtually all particles are between 200 and 800 nanometers, and while largely equi-axed are still slightly angular. Angularity becomes important because it has been learned that one cannot use a binder in preparing preforms for sintering. Silicon is too reactive, the surface area of the powder is very high, and vacuum furnaces are very sensitive to outgassing products. Processing between 8 and 30 meters per gram would require very large amounts of binder in any event.

Angularity aids in the compaction of preforms. Just as sand sculptures at the beach cannot use beach sand (which is spherical), but rather employ angular quarry sand, and just as the sculptors must use water to "lubricate" the quarry sand to encourage a matrix in the angularity of the particles, so it has been found that with this largely equiaxed but angular nano-sized silicon it is possible to press the powder into strong free standing forms by pressing with pressure in the range of 100 or more MPa and some lubrication with a liquid, for instance ethanol.

It is worth noting that there is a well studied quantum size effect being considered in the realm of thermoelectric devices wherein it is now understood that a structure where the contacts paths with dimensions less than 5 nanometers will not conduct electricity very well and less than 200 nanometers will not conduct phonons very well. Therefor when making a porous nanostructure, if one desires high electrical conductivity in the silicon structure itself, one will tailor the starting grains pressed into the preforms to avoid creating contact points less than five nanometers, or make other arrangements for electrical conductivity, for example through addition of graphite, silicon carbide or other complex matrix constituents.

Silicon has a well-known "glassy state" far below the melting point, which is designated by most resources at 1414 to 1417 degrees centigrade. It is questionable if the actual melting point of silicon is known since most all evaluations are done in quartz crucibles which bring oxygen into the melt in the form of silicon monoxide. For instance, clean un-oxidized nano-sized particles of silicon, usually cleaned of the oxide mono native layer with hydrogen fluoride, have been reported to melt at temperatures well below one thousand degrees centigrade.

The surface chemistry of silicon has long been recognized for having a glassy state, and speculation as to its nature often includes reference to the "native oxide" layer normally found on the surface of silicon. By constructing a porous body from nano-sized silicon, which is doped for appropriate conductivity, through bonding of the nano-sized grains in the sub-melting point glassy state domain, it is possible to achieve a silicon electrode superstructure capable of supporting the insertion and extraction involved in lithiation of lithium ion secondary batteries for many cycles.

Various embodiments of the present general inventive concept include sintering silicon particles in a manner much like the process for making rebonded fused silica. In the case of fusing ground particles of fused silica, relatively pure glass sand (Fe about 180 ppm, total 300 ppm impurities) is heating in the presence of oxygen at a temperature in excess of 2103 K (1830° C.). It is then ground into powder, milled in water to make a slip, slip cast or otherwise prepared into a shape and then fired at about 1373 K (1100° C.), some degrees less than its melting point. In this process there are bonds permanently formed at the surface interface of the glass particles. Typical density is about 1.9 grams/cc, about 81% of theoretical density.

The silicon glass of course has a well characterized glass transition profile, but the surface of the silicon also behaves as an amorphous variant and exhibits a low glass transition temperature. (Research by Hedler, Klaumünzer, and Wesch provides further detail regarding the glass transmission of amorphous silicon.)

It is to be expected that the surface area contact between the particles will be increased by the elastic or plastic response of the silicon to the pressing process and from the formation of the meniscus formed between the particles through the glassy behavior of the surface of the silicon during the sintering process.

One of the concerns that must be addressed in the engineering development of the process engineering is the management of the particle size distribution of the milled nano sized silicon. We expect there will be a fairly large fraction of fines below 100 nanometers and the question rises as to how these fines will behave.

We will most likely wish to have a D 50 of the milled nano sized silicon in the range of 300 nm to 1 micron or even larger, all still having a sizable fraction below 100 nm.

Give the particles show morphology trending more towards equiaxed particles than perfectly spherical particles as the D 50 descends, we believe we will have a contact area between the particles substantially larger than the ¼₀th of the diameter one would expect in the perfect Hertzian arrangement of perfect spheres, perhaps ½₀th of the diameter.

It is known that the electron needs a pathway of about 4-6 nm, while the phonon requires a pathway of about 230 to 300 nm. If we aim for a D 50 of about 400 nm to a micron or more, we can expect the lower end of the contact areas could be as low as ½₀th of 40 nm to about 60 nm. A contact area of 2 nm is too small and will interfere with electrical conductivity while 60 nm is in the sweet spot for interfering with thermal conductivity.

Others have observed melting behavior in pure non oxidized silicon in the size range of less than 15 nm in the range of 1,000 K (726 C). Still others have reported similar observations, which is most often reported as a glassy state of the surface of the silicon. Thus, a melting profile of silicon begins at very low temperatures and is a function of the ratio of the surface area and volumes of the particles.

In this case we can expect that the fines below 30 nm or so will melt and migrate to the contact areas between the particles through capillary forces, thereby increasing the footprint of the menisci between the particles. This we believe is a bit of serendipity as we can now include the fines in the mix without the need for expensive and probably very tedious particle size sieving of such small particles, since the increase in the size of the menisci will be much larger proportionately in the smaller menisci, where we need larger increase to assure electrical conductivity and smaller on the larger ones where we have much larger scope for increase. If this serendipity is not in play we may have to resort to particle size management through milling controls or sifting by various means.

As this data shows, it may be possible to sinter at relatively low temperatures, perhaps not 1,623 K (1,350° C.) but as low as 1,173 K (700° C.). However, the higher temperature in fused silica results in a higher STens, because of the larger meniscus formed. One can expect that the same phenomena will be in play with the sintered porous rebonded silicon, so the higher temperature may still be desired.

While the surface of these milled silicon particles are elongated semi-elipsoid shapes, and irregular, SEM and micrograph work shows they increasingly equiaxed as they are milled to D 50 size in the several hundred nanometer size. Surfaces with some irregularities are to be expected. However, these defects are exceptionally small, and the glassy formation of the miniscus cures these defects and creates a larger, more perfect bond between the materials. Pressing the powder extracted from the slurry with some great pressure causes deformation and increases the contact area.

At the same time, when sintering in the range of 1,173-1,723 K (900-1,400° C.). In this range we can expect to form the "glassy" state of the surface of the silicon, which in the abense of vacuum will result in the contact area collecting a mass and resulting in a miniscus increasing the contact area. According to the reports by the investigators at Innovalight, we can expect the smallest particles to be absorbed in the glass state. The size of the miniscus will be a function of the surface area, viscosity, surface energy and temperature of course. So this means that we can expect that the surface area will increase in this respect.

In this case we can expect that we will be able to mill silicon to a D 50 one micron or less, press it into a large pellet, perhaps 25 mm diameter and 25 mm thick, sinter it in a vacuum of about 0.2 microns in the range of 1,173 K and 1,673 K (900-1,400° C.) and have contact areas larger than 5 nm and smaller than 200 nm, resulting in thermal conductivity in the range of 0.5 W/mK and very low stresses on the miniscus as the structure expands and contracts in each cycle. It is a critical part of our design that the electrical conductivity is quite high and quite uniform as this assures uniform isomeric contraction and expansion with extraction and insertion in the lithiation cycles.

In some embodiments of the present general inventive concept, silicon is milled in a protected cover to preclude oxygen. Ethanol is one useful cover, since it protects from oxygen and can be economically recycled.

One advantage of this approach is that a mixture of several elements can be combined in the mill and processed into physical form factors that can dramatically improve the function and cycling lifetime of the electrode.

For instance, in the milling process, silicon carbide (SiC) or other ceramics or covalent materials with semiconductor attributes can be added and milled to the same or nearly the same particle size and distribution. Silicon carbide is a semiconductor, can be doped for very high electrical conductivity, and when sintered can be physically very strong and has a coefficient of thermal expansion similar to that of silicon (4 parts per million for SiC and 3.5 parts per million for silicon).

In the case of the silicon, it can be doped with materials from column III or V, such as boron, phosphorous, arsenic and others to electrical conductivity as high as 109,000 Siemens, as can be silicon carbide.

Silica ($SiO_2$) and graphite (C) can also be added as sintering aids to provide a stronger bonding among the nano particles in the sintering process. In terms of adding sintering aids to create other phases in the physical matrix, the family of oxides, nitrides and carbides are well known to one skilled in the ceramic fabrication arts. For instance yttrium oxide, aluminum oxide, silicon oxide, zirconium oxide are all well known sintering aids in the fabrication of silicon nitride, which can be of value in this approach. The object of this teaching is to give examples of a novel way of adding proscribed amounts of sintering aids to the milling of the silicon at some point to create the desired precursors for fabrication of structures in the matrix of value to the secondary lithium ion battery electrode. Nano sized graphite powder can also be added so to cause the formation of a graphene coating on the surface of the particles when sintered at 1400 in a vacuum of $10^{-5}$ or $10^{-6}$ torr, as well as help form a SiC bond with the available microsilica.

Once the material is properly milled, such that about 95% of the particles are below a minimum (e.g., 1.3 microns), the milled particles must be formed into a preform, optimally without a binder.

In such a case applying a lubricant (e.g., ethanol, among others) to the powders in a pressing tool enables the powders to organize themselves under pressure into a structure that retains significant binderless preform structure. Pressing is done at 100-900 MPa, and in some embodiments at about 450 MPa. A tapered die provides the process efficiency and yield for exit of the pressed preform in the absence of binders or additional lubricants.

Once these preforms are completed and ready to sintered, the object is then sintered in a vacuum furnace. Argon is back filled and evacuated one or more times to remove oxygen from the atmosphere, and oxygen liberated at various temperatures from constituents in the furnace. Temperatures of 300° C. and 700° C. degrees are good points for purging with argon and returning to vacuum at the level of approximately 0.2 microns, or minus 5 or 6 torr. The sintering temperature will depend upon a number of factors, including the mix of carbon, silica, silicon, silicon carbide, dopants, and other materials. Generally, 950 to 1400 centigrade will provide the range of temperature required. If one wished to form graphene on the surface of the particles 1400 centigrade in a vacuum of $10^{-5}$ to $10^{-6}$ torr is advisable.

A key point is the separation of the ethanol or other solvent from the nano-sized powders without contaminating them but also recapturing and recycling the ethanol, both for environmental concerns (it is a VOC) and for economic reasons (i.e., it is an expendable expense whose cost can be dramatically reduced by recycling). There are at least four approaches to extracting such nano-sized filtrate from the solvent: (1) Filters and particularly filter presses: a problem is that the filter screen is going to be very small and get clogged and be very expensive and very high maintenance and we have to choose filter cloths that will not contaminate the silicon; the silicon cannot touch anything metal without contamination; (2) Molecular sieves: even more expensive, would probably have to pump with peristaltic pumps, which are very expensive and all the problems above apply; (3) Mechanical screw type dryers: really economical but cannot imagine not contaminating, so impossible; and (4) Evaporative dryers with vacuum: this reduces the boiling point, and it is possible to recover the ethanol.

Turning now to the figures, FIG. 1 is a flow diagram illustrating an example embodiment of the present invention. A method or process 10 for fabricating a porous silicon-based superstructure filled with interstitial milled material includes milling silicon in an attrition mill 20, with an optional step of adding a dopant 25, such as boron. The milled, nano-scaled silicon particulates are then pressed 30 into a pre-form, and the pressed silicon particulates are then sintered 40, with silicon carbide added 45 before or during the sintering step. The sintering step 40 produces a reaction-sintered silicon carbide superstructure with interstitial silicon particulates; in effect, the final sintered product includes two continuous phases: a silicon carbide continuous phase, and an interstitial nano-sized silicon phase. In some embodiments, a small amount of graphite (generally no more than 5% by weight) is added to the mixture before or during the sintering step.

In the illustrated example embodiment, the interstitial material is silicon, perhaps with a dopant added; but it is to be understood that the interstitial material could comprise other materials, and these interstitial materials likewise fall within the scope of the present general inventive concept. Also, it is to be understood that a variety of dopants can be used in connection with all of the above interstitial materials.

Figure 2:
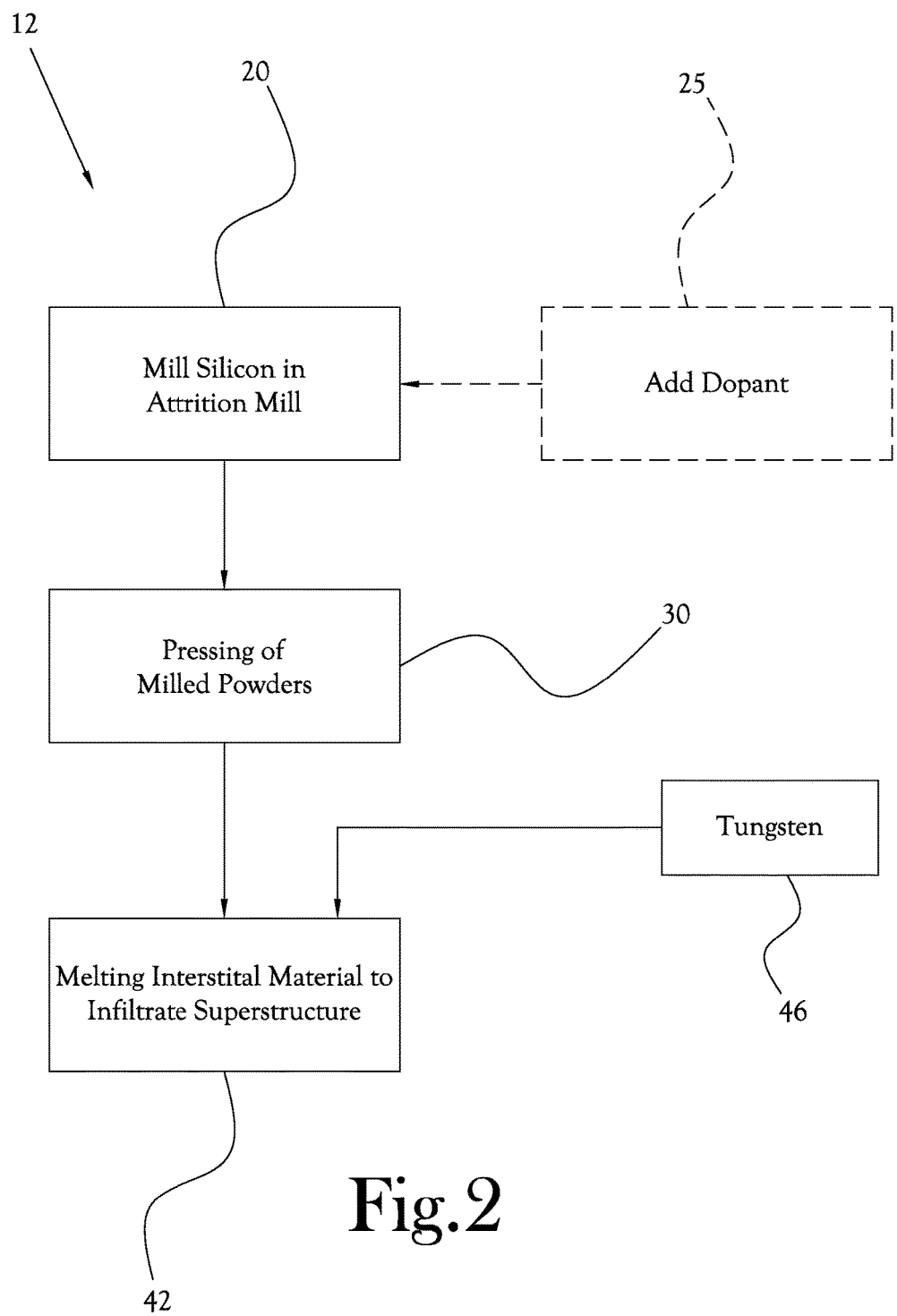
FIG. 2 is a flow diagram of an example embodiment of a method for fabricating a tungsten-based porous superstructure filled with milled interstitial silicon.

FIG. 2 is a flow diagram illustrating an example embodiment of the present invention in which a porous tungsten superstructure is employed. A method or process 12 for fabricating a porous tungsten-based superstructure filled with interstitial milled material includes milling silicon in an attrition mill 20, with an optional step of adding a dopant 25, such as boron. The milled, nano-scaled silicon particulates are then pressed 30 into a pre-form. The interstitial material is then heated under vacuum (as described above) to bring about an amorphous melt state 42, and it is in this state that the "melted" interstitial silicon particulates infiltrate the tungsten superstructure 46.

In the illustrated example embodiment, the interstitial material is silicon, perhaps with a dopant added; but it is to be understood that the interstitial material could comprise other materials, and these interstitial materials likewise fall within the scope of the present general inventive concept. Also, it is to be understood that a variety of dopants can be used in connection with all of the above interstitial materials.

Moreover, in the illustrated example embodiments shown in FIGS. 1 and 2, the superstructures are comprised of (1) reaction-sintered silicon carbide and (2) tungsten. However, it is to be understood that other superstructure materials are feasible and likewise fall within the scope of the present general inventive concept.

In some embodiments, a porous superstructure anode with interstitial silicon further includes graphite. In some such embodiments, graphite is added to an attrition mill and milled with silicon carbide, milling the graphite down to particulates with diameters in the range of 10-100 nanometers. Generally this milling is done under ethanol. Silicon carbide, silicon, and graphite can start very fine, and in some embodiments they are arranged so that in the end the graphite is on the order of a few to tens of nanometers, the silicon is on the order of optimally about 140 nanometers, and the silicon carbide hundreds of nanometers to a few microns. The materials are then sintered at approximately 1400° C. in a vacuum, and this process results in graphene on the surface of the silicon and the silicon carbide (without forming more silicon carbide or transforming the graphite carbon into silicon carbide). This will reduce the surface, meaning no oxygen, and will set up a very high electrically conductive surface, which sets up the Schottky effect. When we have a potential electrically at a quantum interface, or the nanometer layer near a PN junction in a semiconductor, the effect is to lower resistance, or increase the release of electrons. So in the case of the porous superstructure, the silicon will bond with the non-oxidized surface of the tungsten or silicon carbide, and where that superstructure surface interface is very conductive, there should be a Schottky effect at that surface.

In a number of embodiments, when we say that the porous superstructure is "filled" with an interstitial material, the porous superstructure is in fact partially filled—that is, "filled" is to be read as encompassing "partially filled." In many embodiments, such partial filling is required to avoid damage to the porous superstructure by expanding interstitial material during lithiation; if the porous superstructure is only partially filled, then spare volume remains to accommodate the expansion of interstitial material and in particular expansion of the interstitial material particulates. In some embodiments, interior surfaces of the SiC are coated with graphene and then partially filled with graphene-coated silicon particulates to such a volume that the silicon has room to lithiate—that is, to swell and shrink without causing too much stress on the porous superstructure and yet stay electrically connected. In some such embodiments, the graphene-coated silicon particulates have a median particle diameter of around 140 nm.

Coating the interstitial silicon and/or the silicon or silicon carbide superstructure with graphene presents numerous advantages. This addition reduces the surface area of exposed silicon or silicon carbide, bumping up the electrical conductivity and increasing the strength of the porous superstructure. Graphene is one of the strongest materials known, and to date it has been rarely produced in bulk. Example processes embodying the present general inventive concept allow the formation of graphene in situ, for almost no incremental processing cost. Advantages include: reduced oxidation on silicon and silicon carbide surfaces; increased electrical conductivity on the surface; dramatically increased strength between/among the grains; and increased lithiation.

Example embodiments of the present general inventive concept may be achieved by providing a pressed body of milled nano sized silicon, sintered in a vacuum, composed of nano particles where the range of size is more than 80% between 10 and 800 nanometers, and where the average size is less than 800 nanometers, where the particles are largely equiaxed but still slightly angular and made from doped silicon with a high electrical conductivity, in the range of 500 to 100,000 Siemens, and where the nanostructure is based on a glassy state rebonding in the contact areas of the grains which allows insertion and extraction of lithium ions and the accompanying 400% expansion and contraction for many hundreds, thousands, tens of thousands or hundreds of thousands of cycles without cracking, chipping, powderization.

Example embodiments of the present general inventive concept may also be achieved by providing a pressed body of milled nano sized silicon together with silicon carbide and possibly silica and graphite or other carbon source, sintered in a vacuum, composed of nano particles where the range of size is more than 80% between 10 and 800 nanometers, where the particles are largely equiaxed but still slightly angular and made from doped silicon and where the average size is less than 800 nanometers, with a high electrical conductivity, in the range of 500 to 100,000 Siemens, and where the nanostructure is based on a glassy state rebonding in the contact areas of the grains which allows insertion and extraction of lithium ions and the accompanying 400% expansion and contraction for many hundreds, thousands, tens of thousands or hundreds of thousands of cycles without cracking, chipping, powderization.

Further example embodiments of the present general inventive concept may be achieved by providing a pressed body of milled nano sized silicon together with other ceramics able to bond at within and with silicon in the range of 950 to 1400 centigrade in a vacuum and with a similar CTE, and possibly silica and graphite or other carbon source, sintered in a vacuum, composed of nano particles where the range of size is more than 80% between 10 and 800 nanometers, and where the average size is less than 800 nanometers, where the particles are largely equiaxed but still slightly angular and made from doped silicon with a high electrical conductivity, in the range of 500 to 100,000 Siemens, and where the nanostructure is based on a glassy state rebonding in the contact areas of the grains which allows insertion and extraction of lithium ions and the accompanying 400% expansion and contraction for many hundreds, thousands, tens of thousands or hundreds of thousands of cycles without cracking, chipping, powderization In various example embodiments of the present general inventive concept, an anode for a lithium ion secondary battery includes a porous superstructure and an interstitial material including silicon, with the interstitial material introduced into the porous matrix of the superstructure either from milled silicon particulates (said silicon particulates being milled in an attrition mill so that said silicon particulates have a median particle diameter of less than 1,000 nanometers and are substantially equiaxed), or included in the porous structure post-processing by melting silicon in contact with the porous superstructure so that the capillary forces wick the silicon into the porous superstructure and fill it. Where the processing to build the superstructure involves temperatures in excess of 1,400 degrees centigrade, the silicon is introduced by melting; where the processing to build the superstructure involves maximum temperatures of 1,400 centigrade or less, then milled silicon nano particles can be included by mixing or milling and one thermal process step is required.

In some embodiments, the interstitial material includes some dopant in addition to the silicon particulates; generally, the dopant includes boron, phosphorous, arsenic, or other common single or compound semiconductor dopants.

Some embodiments further include graphite, which is co milled with the materials to provide a nano-coating of graphite, which will be converted to graphene through sintering. In some embodiments, the silicon particulates have a median particle diameter of between 50 nanometers and 800 nanometers.

In some embodiments, the silicon particulates have a median particle diameter of approximately 140 to 400 nanometers.

In some embodiments, said porous superstructure includes silicon carbide.

In some embodiments, said anode is fabricated by sintering the silicon carbide with the interstitial material including silicon derived from milled silicon particulates.

In some embodiments, the silicon carbide, silicon and graphite are milled so that the graphite is nano sized, the silicon is an order of magnitude larger than the graphite, and the silicon carbide is larger than the silicon and the graphite is allowed to coat the silicon and silicon carbide as the solvent is removed and the body is pressed without a binder and the body is sintered in a vacuum of $10^{-5}$ to $10^{-6}$ torr at 1,400° C. to allow for the silicon carbide to form into a strong superstructure and for the graphite to convert to a graphene coating on the silicon and silicon carbide structures.

In some embodiments, said porous superstructure includes tungsten.

In some embodiments of the present general inventive concept, a process for creating a silicon-based electrode for a lithium ion secondary battery encompasses milling silicon in an attrition mill, thereby producing milled silicon particulates that have a median particle diameter of less than 1,000 nanometers and are substantially equiaxed; pressing the milled silicon particulates into a pre-form; and sintering the milled silicon particulates into a porous silicon structure. In some embodiments, the silicon is milled with nano graphite powder to form a nano coating of graphite on the silicon, and the sintering of the pressed body is performed at 1,400° C. in a $10^{-5}$ to $10^{-6}$ torr vacuum to form a graphene coating on the silicon particles (the graphite not forming into silicon carbide).

In some embodiments of the above processes, a dopant is added to the silicon. The silicon can be doped in the milling step or prior to milling in the Siemens process or in a previous melt. Of course, in the milling process, where the silicon will be melted, adding through the milling process is close to a no cost process step and maintains very high purity.

In some embodiments, the dopant includes boron or other common semiconductor dopants.

In some embodiments of the present general inventive concept, a tungsten-based electrode for a lithium ion secondary battery encompasses sintered porous tungsten body filled with silicon by melting the silicon in contact with the porous tungsten body, filling the porosity with silicon through the capillary forces generated by the small spaces of the porous tungsten body; this is generally done post processing of the porous tungsten body. In some embodiments, a dopant is added to the silicon. In some embodiments, said dopant includes boron or other common single or compound semiconductor dopants.

In some embodiments, a tungsten-based anode is formed by press-sintering tungsten at approximately 1,600° C. and then filling the sintered superstructure body with melted silicon (or doped silicon-based interstitial material). In some embodiments, graphite is mixed with tungsten powder prior to press-sintering, and then melted silicon-based interstitial material is added. In some embodiments, the silicon-based interstitial material included particulates that are coated with graphene prior to their introduction to the sintered superstructure. In some embodiments, the tungsten is oxidized prior to sintering, since WO3 lithiates well.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An anode for a lithium-ion secondary battery comprising:
    a porous superstructure, said porous superstructure
        including an electrically conductive material selected from the group consisting of silicon carbide and tungsten, said porous superstructure having a porous matrix; and an interstitial material including silicon, said interstitial material being positioned within the porous matrix.

2. The anode for a lithium-ion secondary battery of claim 1 wherein said porous superstructure includes silicon.

3. The anode for a lithium-ion secondary battery of claim 2 wherein said interstitial material including silicon further includes graphene.

4. The anode for a lithium-ion secondary battery of claim 1 wherein said porous superstructure consists essentially of silicon carbide.

5. The anode for a lithium-ion secondary battery of claim 4 wherein said interstitial material including silicon further includes graphene.

6. The anode for a lithium-ion secondary battery of claim 4 wherein said interstitial material includes milled silicon particulates having a median diameter of less than one micron, said milled silicon particulates being sintered with said silicon carbide.

7. The anode for a lithium-ion secondary battery of claim 6 wherein said milled silicon particulates have a median diameter of approximately 140 nanometers.

8. The anode for a lithium-ion secondary battery of claim 1 wherein said porous superstructure consists essentially of tungsten.

9. The anode for a lithium-ion secondary battery of claim 8, said interstitial material formed within the porous matrix.

10. The anode for a lithium-ion secondary battery of claim 8 wherein said interstitial material including silicon further includes graphene.

11. The anode for a lithium-ion secondary battery of claim 1 wherein interstitial material including silicon further includes a dopant selected from the group consisting of boron, phosphorus, arsenic, antimony, bismuth, gallium, indium, thallium, and germanium.

12. An anode for a lithium-ion secondary battery comprising:

an electrically conductive superstructure including a porous matrix including silicon carbide; and an interstitial material including silicon, said interstitial material being positioned within the porous matrix of the electrically conductive superstructure, where the silicon carbide and the silicon have a graphene coating.

13. The anode of claim 12 wherein said interstitial material includes milled silicon particulates having a median diameter from 50 to 800 nanometers.

14. The anode of claim 12 wherein the interstitial material is introduced to said porous matrix during fabrication by melting silicon in contact with the electrically conductive superstructure so that capillary forces introduce silicon into said porous matrix.

15. The anode of claim 12 wherein the interstitial material including silicon further includes a dopant selected to affect the electromechanical properties of the interstitial material.

16. The anode of claim 15 wherein said dopant is selected from the group consisting of boron, phosphorus, arsenic, antimony, bismuth, gallium, indium, thallium, and germanium.

17. A process for fabricating an anode for a lithium-ion secondary battery comprising:

providing a superstructure material with a porous matrix; and infiltrating the porous matrix with an interstitial material including silicon through capillary forces, wherein said superstructure material with the porous matrix includes silicon or silicon carbide, and wherein infiltrating the porous matrix with an interstitial material including silicon involves:

milling silicon in an attrition mill, thereby producing milled silicon particulates that have a median particle diameter of less than one micron and are substantially equiaxed;

pressing the milled silicon particulates into a pre-form with said superstructure material; and sintering said milled silicon particulates and said superstructure material at a temperature less than 1,400 degrees Celsius.

18. The process of claim 17 wherein the milling silicon in the attrition mill further includes mixing graphite with the silicon in the attrition mill and milling the silicon with the graphite to form silicon particulates that include a coating of graphene.

19. The process of claim 17 wherein said superstructure material with a porous matrix further includes tungsten or molybdenum.

\* \* \* \* \*